United States Patent
Jackson et al.

(10) Patent No.: US 7,063,496 B2
(45) Date of Patent: Jun. 20, 2006

(54) DOLLY DEVICE FOR LOADING CONTAINERS

(75) Inventors: Thomas E. Jackson, Versailles, KY (US); Dwayne Mattox, Lexington, KY (US); Randy L. Spangler, Berea, KY (US)

(73) Assignee: Toyota Motor Manufacturing North America, Inc., Erlanger, KY (US)

( * ) Notice: Subject to any disclaimer, the term of this patent is extended or adjusted under 35 U.S.C. 154(b) by 215 days.

(21) Appl. No.: 10/619,775

(22) Filed: Jul. 15, 2003
(Under 37 CFR 1.47)

(65) Prior Publication Data
US 2005/0036871 A1 Feb. 17, 2005

(51) Int. Cl.
*B62B 3/00* (2006.01)
(52) U.S. Cl. .................. 414/532; 414/418; 414/536; 280/79.3; 193/35 A
(58) Field of Classification Search ........... 414/331.09, 414/393, 395, 418, 419, 421, 529, 532, 536, 414/541, 679; 280/79.3; 248/129; 198/463.4; 193/35 A, 35 G
See application file for complete search history.

(56) References Cited

U.S. PATENT DOCUMENTS

| 468,559 | A | | 2/1892 | Chatfield |
| --- | --- | --- | --- | --- |
| 915,721 | A | | 3/1909 | Aldous |
| 1,566,089 | A | | 12/1925 | Harding |
| 2,367,754 | A | | 1/1945 | Cole |
| 2,448,300 | A | | 8/1948 | Eaddy |
| 2,521,803 | A | | 9/1950 | Reed |
| 2,874,860 | A | * | 2/1959 | King ........................... 414/743 |
| 3,122,244 | A | | 2/1964 | Corso |
| 3,137,402 | A | * | 6/1964 | Gunn, Jr. ..................... 414/421 |
| 3,294,266 | A | * | 12/1966 | Snow .......................... 414/421 |
| 3,659,731 | A | * | 5/1972 | Carson ........................ 414/421 |
| 3,777,920 | A | * | 12/1973 | Wiese ......................... 414/421 |
| 3,889,814 | A | * | 6/1975 | Rice ............................ 211/27 |
| 4,055,260 | A | | 10/1977 | Tamas |
| 4,120,411 | A | | 10/1978 | Johnson |
| 4,200,334 | A | * | 4/1980 | Lindholm ...................... 298/7 |
| 4,536,033 | A | * | 8/1985 | Allen ............................ 298/2 |
| 5,320,475 | A | | 6/1994 | Pinder |
| 5,779,428 | A | * | 7/1998 | Dyson et al. ............... 414/536 |
| 5,846,043 | A | * | 12/1998 | Spath ......................... 414/343 |
| 5,951,230 | A | * | 9/1999 | Kruzick et al. ............. 414/421 |
| 6,021,707 | A | * | 2/2000 | Bauer et al. .................. 99/337 |
| 6,186,726 | B1 | * | 2/2001 | Karpisek ..................... 414/421 |

* cited by examiner

*Primary Examiner*—James W. Keenan
(74) *Attorney, Agent, or Firm*—Dinsmore & Shohl LLP

(57) ABSTRACT

A dolly device for loading and unloading a container which comprises a control frame that pivots among a plurality of operational positions such that the control frame facilitates the loading or unloading of the container and supports the container while being transported from location to location.

17 Claims, 7 Drawing Sheets

DOLLY DEVICE FOR LOADING CONTAINERS

TECHNICAL FIELD

The present invention relates to a dolly device for loading and unloading containers to be transported between loading/unloading areas such as from docking stations to various unloading stations; and more particularly, to a dolly device having a control frame that pivots to conveniently allow containers to be loaded and unloaded and supports the container while being transported from station to station.

BACKGROUND

Material handling problems have plagued many facilities, forcing them to develop various techniques and methods to better situate materials throughout a system to enhance productivity and efficiency. However, transporting such materials in an industrial setting to designated areas has proven to be an continuously-evolving process. The most obvious solution incorporated by many is the use of forklift devices that permit the lifting of crates, containers and various packaged materials and move them from location to location throughout a plant, warehouse or facility. However, this solution also inherently creates additional concerns, for example, forklifts must be able to effectively move throughout a system, meaning that appropriate spacing and clearance must be available for the forklifts to reach all areas where materials must be introduced or removed from the system. Furthermore, forklifts pose additional costs to companies, particularly those costs associated with the purchasing, maintaining, and storing the forklift equipment, as well as the costs of providing safety measures to protect people operating and working around the forklifts.

Additionally, many companies do not have the resources available to maintain and design their production systems so that forklifts can effectively be used to transport materials in containers from various loading and unloading stations. Despite continuing efforts to achieve a more effective device by which to facilitate the loading and unloading of containers to industries, such devices have not been introduced which reduce the costs associated with the current devices designed to achieve the desired results. The present invention enables companies to effectively and easily load and unload heavy containers at a variety of designated locations. The dolly device generally includes a base having a lower portion supported by roller devices, such as wheels, a support surface mounted to the base on which a container is to be placed, a control frame mounted above the base and support surface which pivots, facilitating the loading and unloading of the container, and a locking mechanism having at least one locking position to hold the control frame in a stop position. The support surface generally comprises friction reducing members to facilitate the movement of the container relative to the dolly device while it is being loaded onto or unloaded from the dolly device. The base can also be configured to enable the loading and unloading of a container by aligning the support surface with the container at the relative station, more particularly it could include an adjustable assembly which accommodates various loading/unloading heights and substantially eliminates any lifting of the container relative to the dolly device. In addition, the dolly device of the present invention provides a very effective tool in the materials handling arena which reduces costs, providing an effective alternative to forklifts and other comparable mechanisms.

SUMMARY OF THE INVENTION

According to one aspect of the present invention, a dolly device is provided for loading and unloading containers.

According to another aspect of the present invention, a dolly device is provided that includes a control frame with pivots to allow a container to be loaded or unloaded and supports the container while it is transported.

In accordance with another aspect of the present invention, a dolly device is provided which allows a user to align the support surface with the loading or unloading station associated with the container.

In yet another aspect of the present invention, a dolly device is provided that substantially eliminates the effort necessary to lift the container to various heights.

In accordance with one or more of the above-described objects, the present invention provides a dolly device for loading and unloading containers that includes a base having a lower portion supported by a plurality of roller devices, a support surface which is operably mounted relative to the base having a plurality of friction reducing members, a control frame mounted above the base and the support surface for pivoting between a plurality of positions limiting the movement of a container, and a locking mechanism having at least one locking position for maintaining the control frame in one of a plurality of stop positions. In one exemplary embodiment of the present invention, the control frame is mounted by support members which extend between the base and the control frame. In particular, the support members provide support to the control frame to allow for its pivotal movement relative to the base. In another exemplary embodiment of the present invention, the support surface is slidably mounted along the base of the dolly device. Moreover, the support surface can be adjustable along substantially lengthwise and/or substantially widthwise axes relative to the base.

Still other advantages, applications and exemplary embodiments of the present invention will become apparent to those skilled in this art from the following description wherein there is shown and/or described several exemplary embodiments of this invention, by way of illustration, for carrying out the invention. As will be realized, the invention is capable of other different aspects, all without departing from the invention. Accordingly, the descriptions and drawings should be regarded as illustrative in nature and not restrictive.

BRIEF DESCRIPTION OF THE DRAWINGS

While the specification concludes with claims which particularly point out and distinctly claim the present invention, it is believed that the present invention will be better understood from the following description of exemplary embodiments, taken in conjunction with the accompanying drawings, in which like reference numerals identify like elements throughout the views and wherein:

DETAILED DESCRIPTION OF EXEMPLARY EMBODIMENTS OF THE INVENTION

Figure 1:
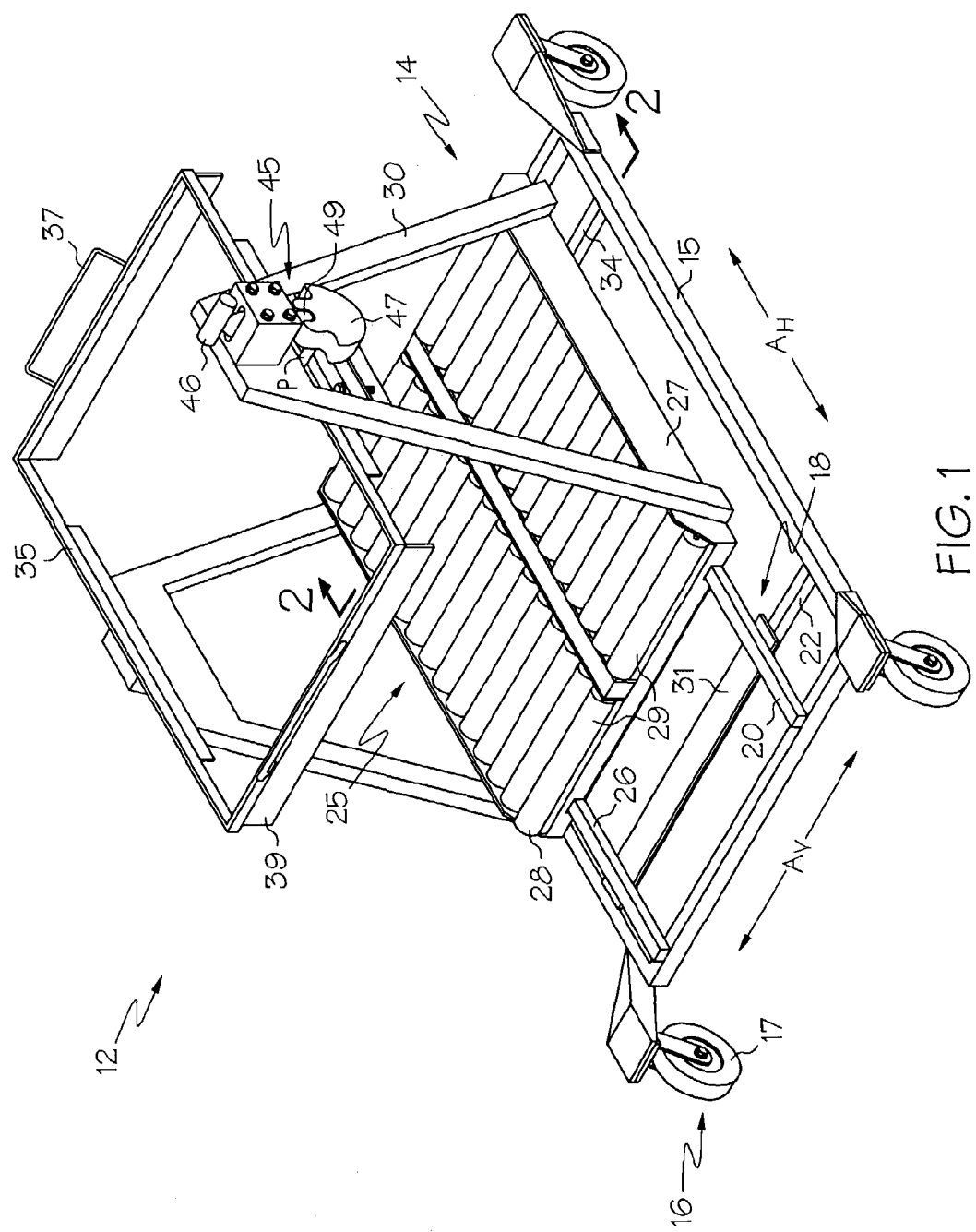
FIG. 1 is a perspective view of an unloaded dolly device.
Figure 2:
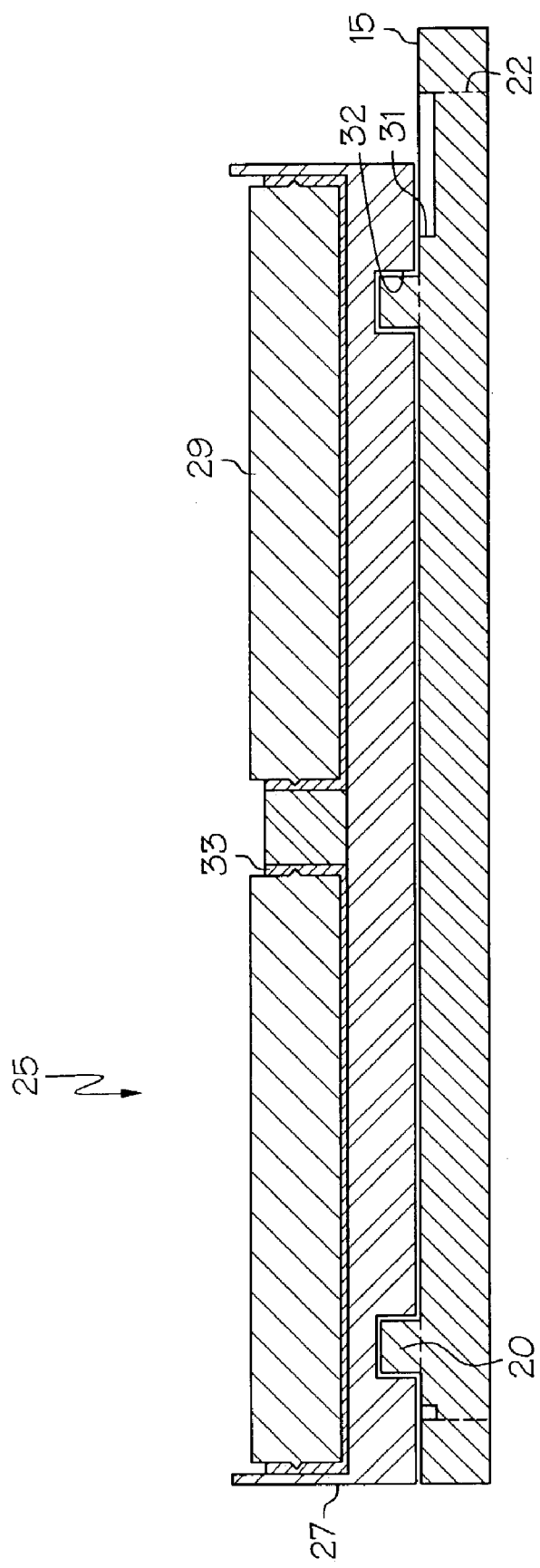
FIG. 2 is a sectional view taken along line 2—2 of FIG. 1 illustrating the cross-section of the base and lower frame.
Figure 3A:
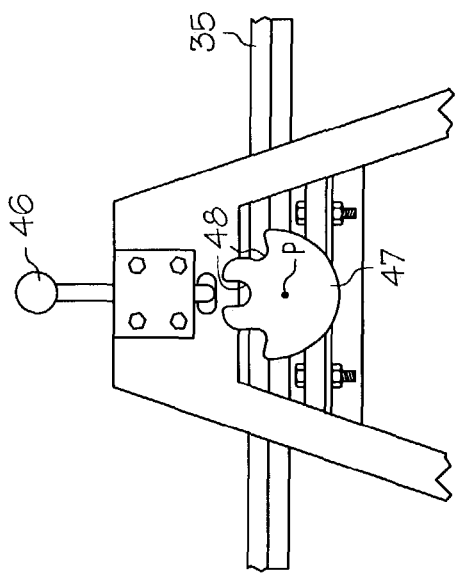
FIGS. 3A, 3B and 3C are enlarged partial views illustrating a locking mechanism such as shown in FIG. 1, and illustrating exemplary stop positions of the control frame as the control frame moves among a plurality of operational positions.
Figure 3B:
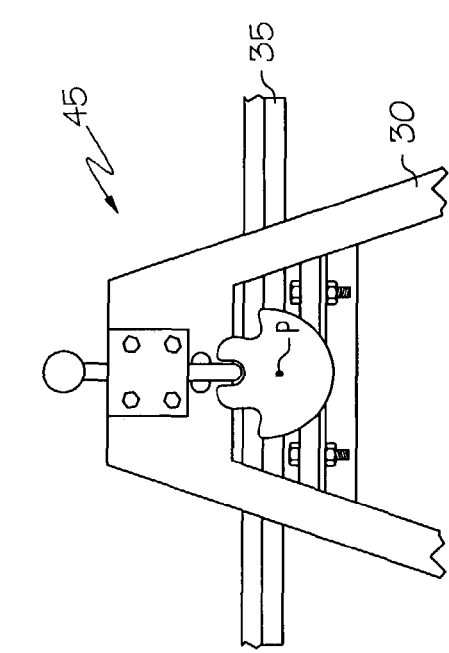
Figure 3C:
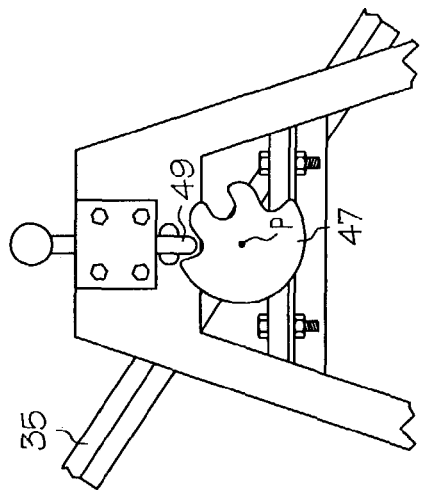
Figure 4:
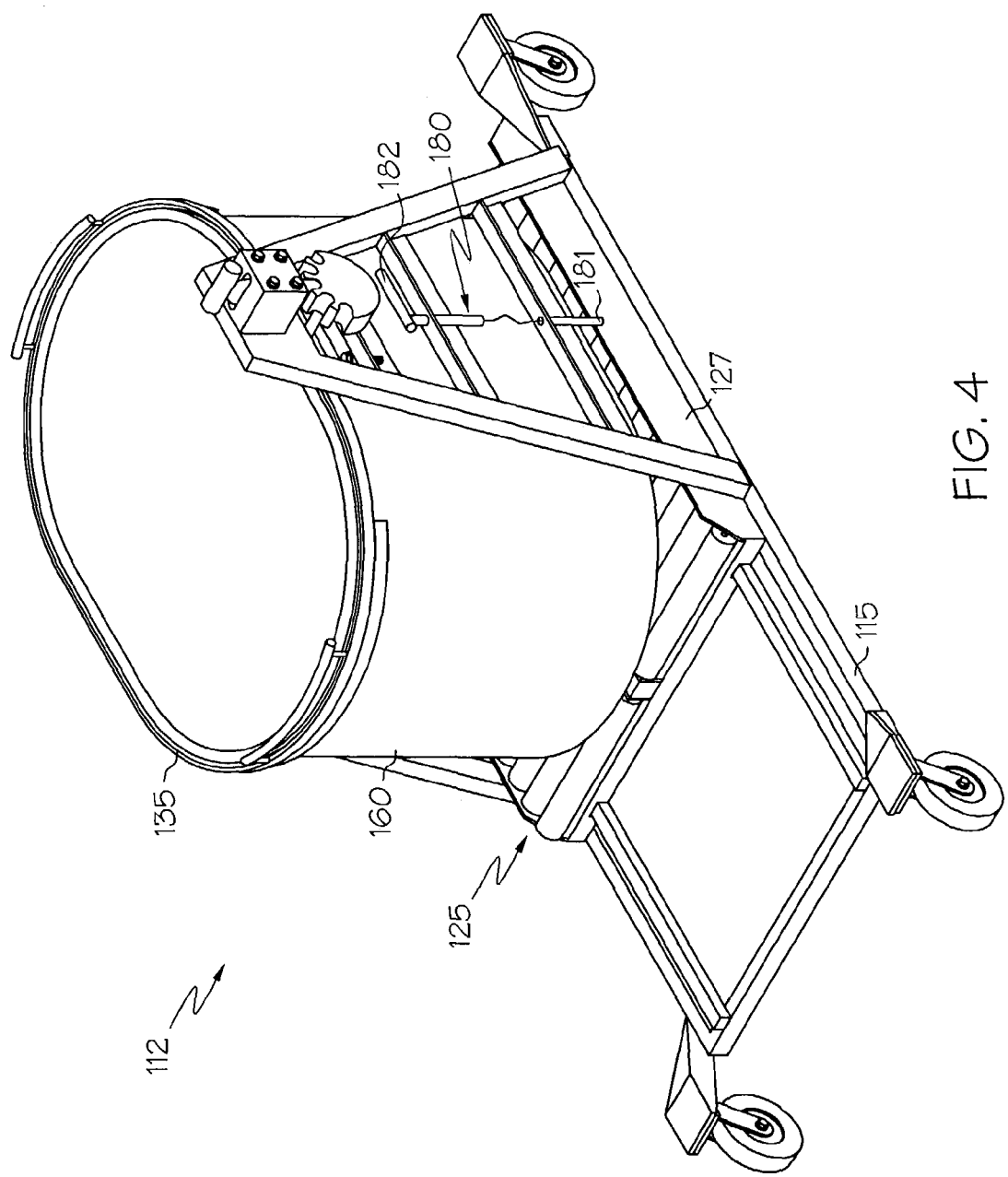
FIG. 4 is a perspective view of yet another embodiment of the dolly device of the present invention having a cylindrical control frame and loaded with a cylindrical container.
Figure 5:
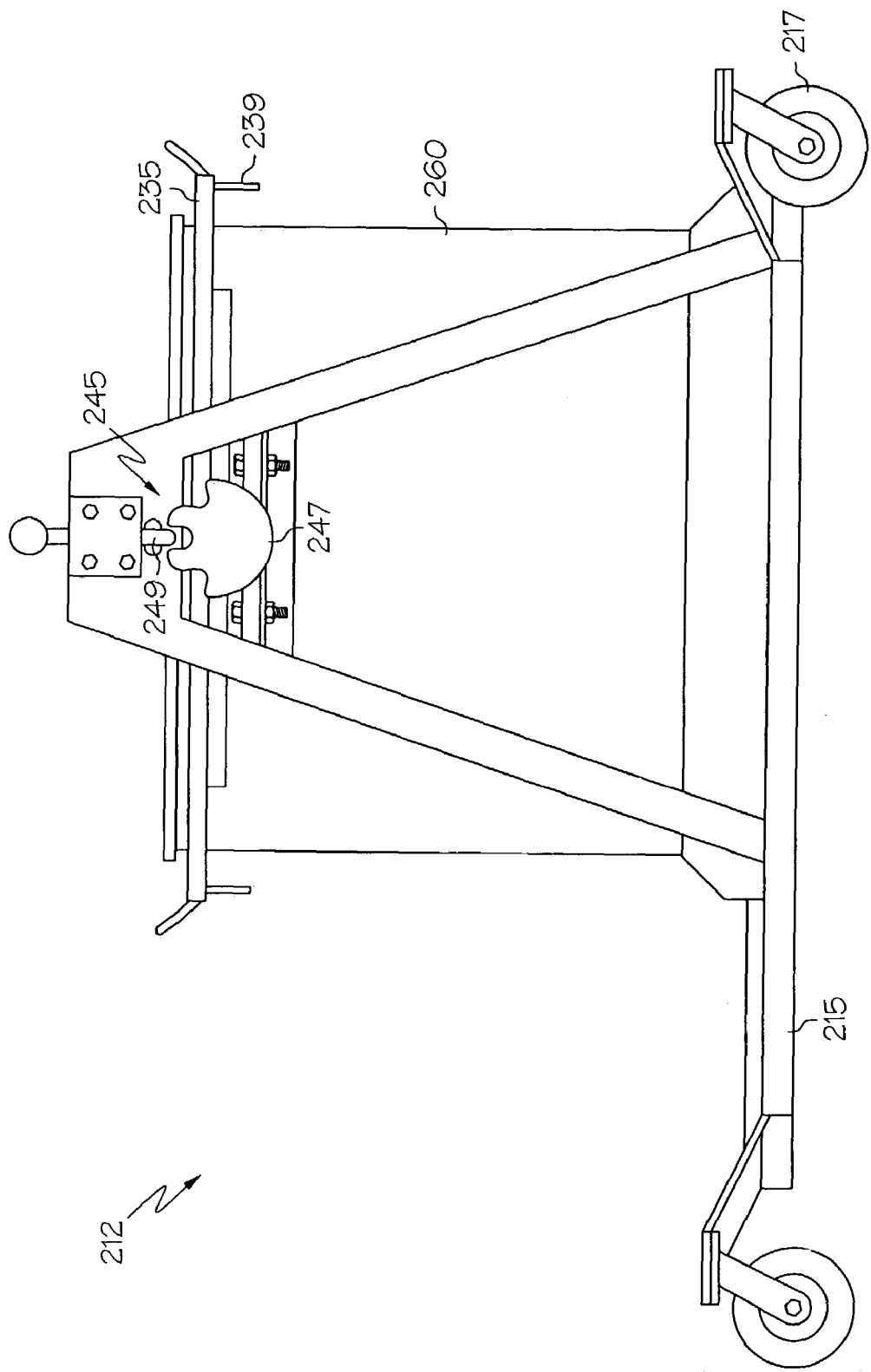
FIG. 5 is a side elevational view of yet another embodiment of the dolly device of the present invention illustrated in a loaded position carrying a container.
Figure 6:
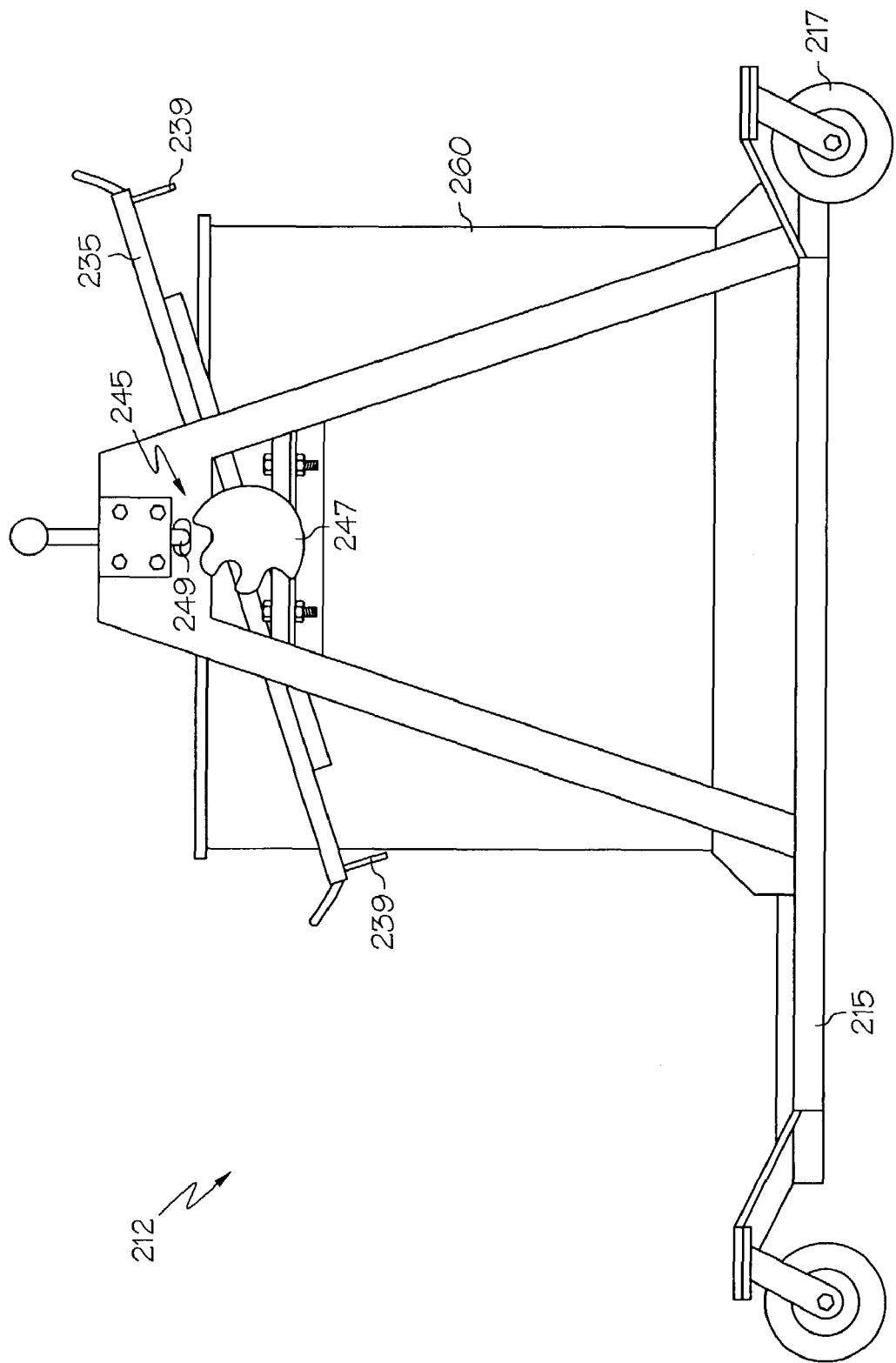
FIG. 6 is a side elevational view of the dolly device of FIG. 6 illustrating the control frame in its tilted position to allow for the unloading of the container.
Figure 7:
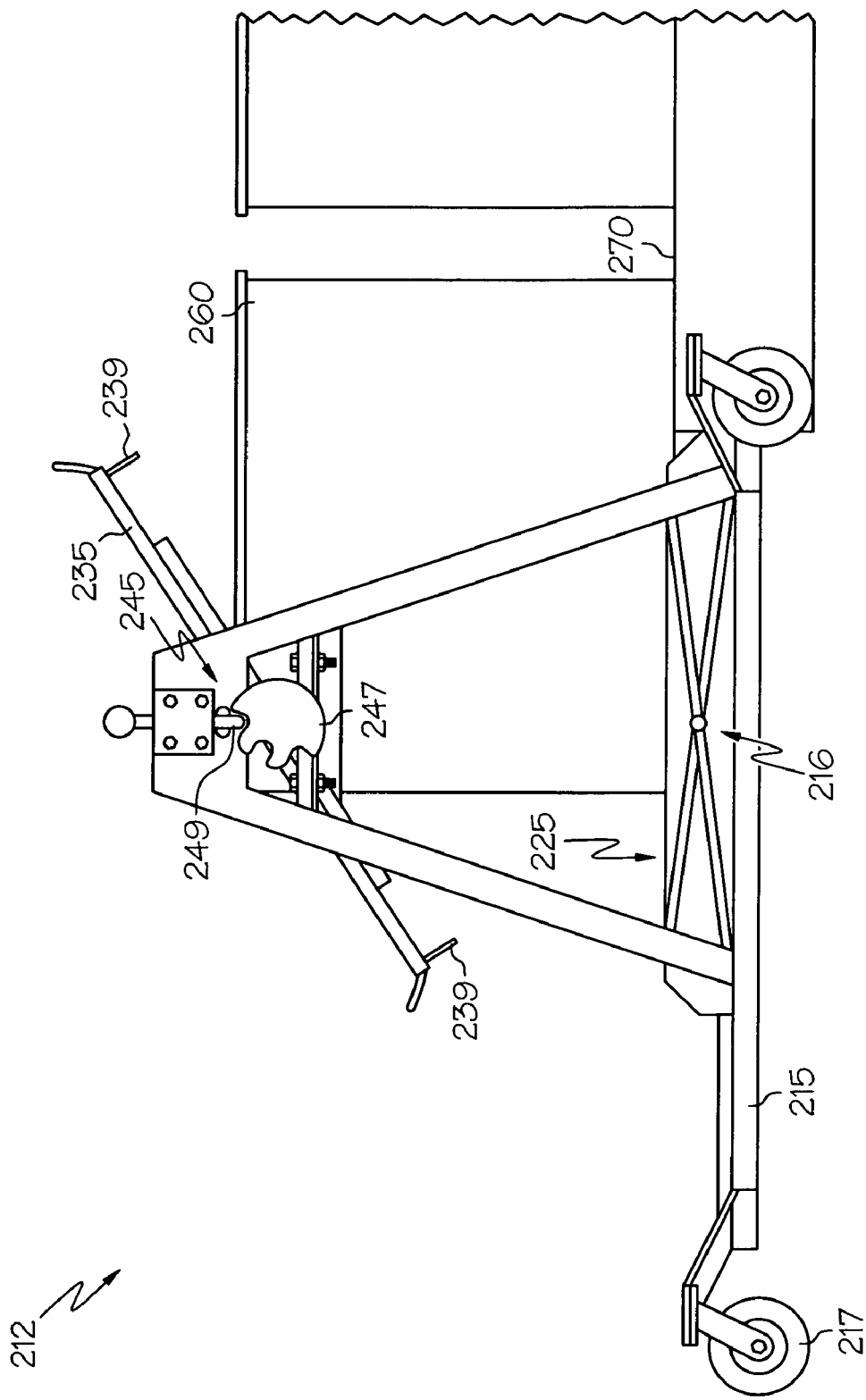
FIG. 7 is a side elevational view of the dolly device illustrating the movement of a container from or onto the dolly device.

The present invention and its operation are hereinafter described in detail in connection with the views of FIGS. 1–7 illustrating various aspects of exemplary embodiments thereof. In FIGS. 1–3, a dolly device 12 for carrying a container 260 (see FIG. 5) is illustrated as including a base 15 having a lower portion supported by a plurality of roller devices 16 such as wheels 17. It will be understood that such roller devices 16 could be alternatively provided in the form of casters or other arrangements for facilitating movement of dolly device 12 among various loading/unloading stations in use. A support surface 25 comprising a lower frame 27 is operably mounted relative to the base 15. A control frame 35 is mounted above the base 15 and support surface 25 which pivots among a plurality of operational positions to limit the movement of the container 260. Finally, a locking mechanism 45 used for holding the control frame 35 in one of a plurality of stop positions, such that the container 260 can be loaded or unloaded from the dolly device 12. FIG. 4 illustrates a dolly device 112 similar to that depicted in FIG. 1, however, this exemplary embodiment includes a control frame 135 having a substantially cylindrical shape to surround the upper portion of a container 160 also having a substantially cylindrical shape. FIGS. 5–7 depict the method for loading and/or unloading a container 260 onto or from the dolly device 212.

FIG. 1 depicts a perspective view of one embodiment of the dolly device 12 of the present invention such as for loading or unloading a container 260. As illustrated in the exemplary embodiment of FIG. 1, an exemplary dolly device 12 can generally include a base 15 supported by a plurality of roller devices 16 (i.e., wheels 17) moveably supporting a superstructure 14 having a lower frame 27 and a pair of spaced upright supports 30 rotatably mounting a control frame 35. The support surface 25 on which the container 260 rests while being transported can also include a plurality of friction reducing members 28 such as tubular rollers, casters, bearings, one or more rotatable belts, or the like. Extending from the lower frame 27 are upright support members 30, wherein at least two support members 30 are shown to extend to rotatably support a control frame 35. The control frame 35 serves as the mechanism which effectively permits the controlled loading and facilitates the unloading of a container 260. In this example, the control frame 35 is pivotally supported between at least two points on the support members 30, and can pivot among a plurality of operational positions for selectively limiting the movement of the container 260. As will be discussed in more detail below, the control frame's pivotal movement can be selectively restricted by a locking mechanism 45 having at least one locking position for securely holding the control frame 35 in one of a plurality of stop positions.

FIG. 2 generally illustrates a sectional view of one exemplary embodiment of the present invention describing a slidable support 18 between the base 15 and the lower frame 27. As will be explained, and as shown in FIGS. 1 and 2, the support surface 25 can be configured to move along the base 15 in both the lengthwise ($A_H$) and widthwise ($A_V$) axes relative to the base 15. As shown in the exemplary embodiment of FIG. 2, the lower frame 27 can be slidably mounted on the base 15 by utilizing a linear rail configuration, wherein the lower frame 27 rides along an upper slidable support 20 along the substantially lengthwise axis ($A_H$) relative to the base 15. In the exemplary embodiment of FIG. 2, the lower frame 27 has at least two recessed grooves 32 which extend along at least a portion of the length of the lower frame 27 and are configured to receive and interface with the upper slidable support 20. The upper slidable support 20 can comprise at least two substantially parallel beams 26 having fixed ends, wherein the superstructure 14 traverses the upper slidable support 20 along the lengthwise axis ($A_H$). The beams 26 of the upper slidable support 20 can have a variety of outer circumferences on which the superstructure 14 can traverse, including rectangular, grooved, polygonal or cylindrical shapes. In another embodiment of the invention for use in manufacturing facilities and the like, the lower frame 27 might be configured to traverse along the lengthwise axis ($A_H$) relative to the base 15 up to at least 18 inches permitting a user to shift the container 260 to readily align and interact with a loading or unloading station to further facilitate transfer procedures.

Also as indicated in FIGS. 1 and 2, the upper slidable support 20 can also be fixedly attached to the lower slidable support 22 by way of an intermediate member 31. The upper slidable support 20 is illustrated in this example as resting on the base 15, but is not attached at a fixed point to the base 15 so that the support surface 25 can move along the widthwise axis ($A_V$) providing lateral movement for easily aligning the dolly device 12 while loading or unloading a container 260. The upper slidable support 20 is attached at fixed points along the intermediate member 31. The intermediate member 31 rides along the lower slideable support 22 in a manner substantially similar to that of the linear rail configuration previously discussed. The lower slidable support 22 is illustrated as comprising at least two beams 34 substantially similar to those of the upper slidable support 20, which can comprise various shapes, such as a rectangular or cylindrical configuration. The beams 34 can be integrally fixed to the base 15 of the dolly device 12 at both ends, such that two beams 34 help define a rigid structure which allows the lower slidable support 22 to extend along the same planar axis as the base 15.

In another embodiment of the present invention configured for manufacturing facilities, the support surface 25 can traverse along the widthwise axis ($A_V$) relative to the base 15 at least 4 inches permitting a user to shift and align the container 260 to easily align and interact with a loading or unloading station. It is also important to note, that although FIG. 2 illustrates a linear rail configuration to slidably mount the support surface 25 to the base 15 of the dolly device 12, numerous other configurations could be implemented to slidably mount the support surface 25, such as frictionless members or hydraulics. For example, in another embodiment of the present invention, frictionless members (i.e. steel balls or bearing devices) could be mounted to the lower frame 27 such that the frictionless members would ride on a surface of the base, allowing the user to move the support surface 25, and therefore, the container 260, along the lengthwise and/or widthwise axes relative to the base 15.

As further shown in the exemplary embodiment of FIG. 2, the support surface 25 comprises a plurality of friction reducing members 28. The friction reducing members 28 are capable of receiving a container 260 and reducing the amount of friction between a container 260 and support surface 25 such that the container 260 can move more smoothly onto and off of the dolly device 12 upon being loaded or unloaded. In one exemplary embodiment, the friction reducing members 28 comprise rotatable members such as rollers, casters or wheels. Furthermore, in another exemplary embodiment, the rotatable members comprise cylindrical rollers 29. The cylindrical rollers may be contained in a tray 33 which is between the cylindrical rollers 29 and lower frame 27 defining the bottom portion of the support surface 25. As indicated in FIGS. 1 and 2, the cylindrical rollers 29 can be aligned in parallel such that two or more rows of cylindrical rollers 29 are aligned along the support surface 25 allowing containers 260 to smoothly travel on and off of the dolly device 12. The cylindrical rollers 29 are integrally fixed at two ends to the tray 33, such that the cylindrical rollers 29 pivot around a central radius reducing the force required by a user to move a container 260 across the upper surface of the cylindrical rollers 29 relative to the support surface 25.

As further depicted in the perspective view of FIG. 1, the exemplary embodiment illustrates a control frame 35 surrounding the upper portion of the container 260, such that it limits the movement of the container 260 as it is transported to a desired location. As illustrated in the exemplary embodiment, the control frame 35 comprises a substantially rectangular shape allowing it to effectively circumscribe some or all of the upper portion of the container 260. However, a control frame 35 may comprises various shapes, such as a polygonal, cylinder, as later shown in FIG. 4. Furthermore, the control frame 35 as illustrated has a leverage handle 37 and a extension 39, such that the leverage handle 37 and the extension 39 work in tandem when unloading a container 260, as better illustrated in FIGS. 5–7, depicting the removal of a container 260 from the dolly device 12. The leverage handle 37 provides convenient manual control without a need to place ones hands in a position which might interfere with movement of the container 260 or risk injury. The extension 39 can provide the user a point of contact with the control frame 35, providing ease of use and further safeguarding the user when loading and unloading the container 260 from the dolly device 12.

FIGS. 3A, 3B and 3C illustrate side elevational views of one exemplary embodiment of the operational relationship between the control frame 35 and an associated locking mechanism 45. As collectively shown, the locking mechanism 45 utilizes a pin and key configuration such that a pin 49 selectively prevents the key 47 from rotating along a pivot point (P) also associated with the control frame 35. In this example, once the locking mechanism 45 is rotated to one of its locking positions, for example, the pin 49 engages the key 47 at one of the recessed portions 48, the locking position prevents the control frame 35 from further rotating, and hence, is stationed at one of its plurality of stop positions. In order to move the control frame 35 from one operational position to another, the locking mechanism 45 would sequentially engage various locking positions. For example, as is depicted in FIGS. 3A, 3B and 3C, the control frame 35 can be rotated by releasing the pin 49 from a recessed portion 48 in the key 47 such that a user can release the pin 47 from the locking mechanism 45 by actuating the locking handle 46. Once the pin 49 is removed from any recessed portion 48 in the key 47, the control frame 35 can be pivoted to another operational position.

Once the control frame 35 reaches the effective loading/unloading operational position, which can be defined as the position in which the control frame must be raised or lowered to effectively provide or allow clearance of the container for the loading or unloading of the container 260, another locking position can be selected by the user, such that the control frame 35 is in another stop position. As before, once the control frame 35 is in a stop position, the control frame 35 cannot be further pivoted around its pivotal axis. As can be appreciated from the depictions, the control frame 35 can be raised or lowered from either side due to the nature of the locking mechanism 45, permitting the control frame 35 to rotate around its pivotal axis. As shown in FIG. 4, the control frame is set in an operational position such that the control frame 35 is effectively at least partially surrounding the upper portion of a container 260 to limit movement of the container during transportation. In this example, the supporting operational position of the control frame 35 is in a substantially horizontal position such as seen in FIGS. 1 and 3A.

Although FIGS. 3A, 3B and 3C illustrate three locking positions, the present invention can comprise locking mechanisms which provide significantly more locking positions by which to limit the pivotal movement of the control frame 35 and/or control the loading, unloading and support of a container 260. For example, the locking mechanism 45 in another exemplary embodiment might comprise a key 47 having a larger number of recessed portions 48 in which the pin 49, and/or another locking member, could engage the key 49, such that the control frame 35 could have more stop positions as it rotates around its pivotal axis. Such a configuration would provide greater flexibility in regards to the type of container 260 that may be loaded or unloaded onto or from the dolly device 12. For example, a taller container would need to have the control frame 35 pivoted to a much greater angle for loading and unloading clearance than would a shorter container. Additional rotation might allow for appropriate clearance space to be created between the control frame 35 and the associated container 260 to be loaded or unloaded to/from a desired location.

In another embodiment of the present invention, the locking mechanism 45 could comprise a screw fastener (not shown), which allows a user to adjust the pressure placed on the control frame 35 holding it at one stop position, and then simply release the pressure restoring the pivotal movement of the control frame 35 so that it could be re-positioned at another operational position. This embodiment might utilize a "key" without notches and a thumb screw which could be selectively tightened against that key. Once the new operational position is reached, the user reapplies the pressure by tightening the screw fastener forcing the control frame 35 to remain at any particular stop position. It can be appreciated by those skilled in the art, that a number of locking mechanisms and quick release configurations could be applied to limit the pivotal movement of the control frame 35, thereby creating multiple stop positions as the control frame 35 is pivoted from one operational position to the next.

As illustrated in FIG. 4, another exemplary embodiment of the dolly device 112 includes a control frame 135 at least partially surrounding the upper portion of a container 160 having a substantially cylindrical configuration. FIG. 4 also illustrates a support surface 125 that moves along a substantially horizontal axis ($A_H$) relative to the base 115 to facilitate the loading or unloading of the container 160 utilizing a linear rail system similar to that described earlier. The lower frame 127 of the support surface 125 can be prevented from moving by a tray lock 180, wherein a pin 181 may be inserted into a hole in the lower frame 127 and engage one of a plurality of holes along the base 115, preventing the surface support 125 from sliding along the base 115. As depicted in the exemplary embodiment of FIG. 4, the pin 181 can be operably engaged or disengaged by a handle 182 which permits the user to selectively lock the support surface 125 such that it cannot move along the base 115 of the dolly device 112. In another exemplary embodiment, the tray lock 180 may include dampeners, or the like, to prevent the support surface 125 from moving along the base 115.

In another exemplary embodiment of the present invention, the dolly device 212 comprises a base having an adjustable assembly 216 configured to selectively locate the support surface 225 at one of a plurality of heights relative to the base 215. The adjustable assembly 216 could provide the dolly device 212 with a plurality of predetermined alternative operational heights relative to the base 215 such that a container could be transported from locations of varying heights eliminating the need to adjust the heights of the desired locations in which the containers are being delivered. Providing this additional characteristic provides various benefits such as eliminating costs and downtime in rearranging the facility in order to process the containers 260 throughout the system. Furthermore, the adjustable assembly 216 can comprise, for example, a hydraulic or pneumatic lift, a cam mechanism, a scissors jack arrangement, or a multi-pin locking device permitting the base 215 to adjust the height of the support surface 225 on which the container 260 rests. The vertical adjustability could provide the user with finite control, permitting them to finely adjust the height of the support surface 225 to better align the container 260 with the station surface 270 of a particular desired loading or unloading station. This would also provide more flexibility to the dolly device, making it more widely applicable without customization.

FIGS. 5, 6 and 7 further illustrate the method by which a container 260 can be loaded and unloaded from the dolly device 212 as described in the present invention. As shown in FIG. 5, a container 260 is loaded onto the dolly device 212 such that its base 215 is in contact with the support surface 225 and the control frame 235 surrounds the upper portion of the container 260 and the locking mechanism 235 is positioned such that the pivotal movement of the control frame 235 is limited. As shown in FIG. 6, the locking mechanism 245 has now been released such that the pin 249 has been released from insertion with the key 247, which now allows the control frame 235 to pivot around its pivotal axis. Upon being pivoted, the control frame 235 interfaces with the container 260 wherein the extension 239 at one end of the control frame 235 comes into contact with the side of the container providing leverage to the user and initially moves the slidable support surface 225 towards the end of the base 215 to be readied for unloading. Finally, as shown in FIG. 7, once the dolly device 212 is moved into close proximity or contact with the station at which the container 260 is to be unloaded, the dolly device 212 is capable of becoming adjacent to the unloading station such that the unloading station is adjacent the support surface 225 that has been slidably moved along the lengthwise and/or widthwise axis relative to the base 215. In one exemplary embodiment, as shown in FIG. 7, the locking mechanism 235 can be reestablished such that the pin 249 once again is in contact with the key 247 such that the control frame 235 is at another one of its stop positions (e.g., an unloading/loading position) while the container 260 is being unloaded from the support surface 235 to the unloading station. As depicted in FIG. 7, the dolly device 212 can have the support surface 225 be substantially adjacent to the station surface 270 by having the wheels 217 which allow the dolly device 212 to be moved, slide beyond the contact point of the station surface 270 to easily allow the container 260 to be transported to or from the dolly device 212. In addition, it can be appreciated by those skilled in the art that to provide additional security and safety while loading or unloading containers 260 the wheels 217 can be locked such that the dolly device 212 is substantially prevented from shifting or rolling as the container 260 is transported to or from the dolly device 212.

Although not illustrated in the figures, the loading of the container would be illustrated in a manner similar to that described by FIGS. 5–7, however, essentially the operation would be in reverse wherein the container would be moved towards an aligned dolly device which would be adjacent to the loading station, the control frame would be in a stop position such that the locking mechanism would be in place preventing the control frame from pivoting around its point of rotation, thereby allowing the container to be moved onto the dolly device. Once the container was successfully placed onto the support surface of the dolly device, the locking mechanism would be released and the control frame would be allowed to surround the upper circumference of the container and the locking mechanism would once again be actuated such that the control frame would limit the movement of the container on the support surface while the dolly device was transporting it from the loading station to its unloading station.

The foregoing description of various embodiments of the present invention has been presented for purposes of illustration and description. It is not intended to be exhaustive or to limit the invention to the forms described. Further modifications are possible in light of the above teachings and would be understood by those of ordinary skill. The embodiments were chosen and described in order to provide examples for illustrating the various principals and adaptability of the invention and various embodiments as are suited to exemplary uses contemplated. Consequently, it is hereby intended that the scope of the present invention is not to be limited to or by the exemplary embodiments shown and/or described herein, but are to be defined by the claims appended hereto.

We claim:

1. A dolly device for loading and unloading a container, comprising:
   a. a base having a lower portion supported by a plurality of roller devices;
   b. a support surface operably mounted relative to the base and having a plurality of friction reducing members configured to reduce the amount of friction between the support surface and a container moving on the support surface;
   c. a control frame mounted above the base and the support surface for pivoting between a plurality of operational positions for selectively limiting the movement of a container supported on the support surface; and
   d. a locking mechanism having a plurality of locking positions configured to selectively hold the control frame in a plurality of stop positions.

2. A dolly device according to claim 1, wherein the control frame is mounted by support members.

3. A dolly device according to claim 2, wherein the support members extend between the base and the control frame providing support for pivotal movement of the control frame relative to the base.

4. A dolly device according to claim 1, wherein the support surface is movably supported relative to the base.

5. A dolly device according to claim 4, wherein the support surface is mounted relative to the base such that the support surface can be adjusted along a substantially horizontal axis relative to the base.

6. A dolly device according to claim 4, wherein the support surface is mounted relative to the base such that the support surface can be adjusted along both the substantially widthwise and substantially lengthwise axes relative to the base.

7. A dolly device according to claim 4, further comprising an adjustable assembly configured to selectively locate the support surface at one of a plurality of heights relative to the base.

8. A dolly device according to claim 1, wherein the friction reducing members comprise rotatable members.

9. A dolly device according to claim 8, wherein the rotatable members comprise cylindrical rollers.

10. A dolly device according to claim 1, wherein the control frame comprises at least one leverage handle.

11. A dolly device according to claim 10, wherein the control frame comprises at least one unloading extension configured with the leverage handle to initiate removal of the container from the dolly device.

12. A dolly device according to claim 1, wherein the locking mechanism comprises at least three locking positions, each corresponding to an operational position of the control frame.

13. A dolly device for loading and unloading a container, comprising:
    a. a base having a lower portion supported by a plurality of roller devices;
    b. a support surface operably mounted relative to the base and having a plurality of friction reducing members configured to reduce the amount of friction between the support surface and a container moving on the support surface;
    c. a control frame mounted above the base and the support surface for pivoting between a plurality of operational positions for selectively limiting the movement of a container supported on the support surface; and
    d. a multi-positional gate lock attached to the control frame and defining a plurality of unloading and loading positions for the control frame,
    e. support members extending between the base and the control frame providing support for pivotal movement of the control frame relative to the base.

14. A dolly device according to claim 13, further comprising an adjustable assembly configured to selectively locate the support surface at one of a plurality of heights relative to the base.

15. A dolly device according to claim 13, wherein the support surface is mounted relative to the base such that it can be adjusted along both the substantially widthwise and substantially lengthwise axes relative to the support surface.

16. A dolly device according to claim 13, wherein the control frame comprises at least one leverage handle.

17. A dolly device according to claim 16, wherein the control frame comprises at least one unloading extension configured with the leverage handle to initiate removal of the container from the dolly device.

* * * * *